United States Patent
Ko et al.

(10) Patent No.: US 7,625,112 B2
(45) Date of Patent: Dec. 1, 2009

(54) LAMP-SUPPORTING UNIT, BACKLIGHT ASSEMBLY HAVING THE LAMP-SUPPORTING UNIT AND DISPLAY APPARATUS HAVING THE BACKLIGHT ASSEMBLY

(75) Inventors: Kyung-Rok Ko, Suwon-si (KR);
Jae-Hwan Chun, Suwon-si (KR);
Jong-Ho Won, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 89 days.

(21) Appl. No.: 11/223,879

(22) Filed: Sep. 9, 2005

(65) Prior Publication Data
US 2006/0050518 A1  Mar. 9, 2006

(30) Foreign Application Priority Data
Sep. 9, 2004  (KR) ............. 10-2004-0072306

(51) Int. Cl.
*F21F 7/04* (2006.01)
(52) U.S. Cl. .......... 362/633; 362/225; 362/23; 362/26; 362/27; 362/600
(58) Field of Classification Search ........... 362/633, 362/225, 23, 26, 27, 600, 613, 614, 632, 362/634
See application file for complete search history.

(56) References Cited

U.S. PATENT DOCUMENTS

| 6,905,224 | B2 * | 6/2005 | Yoo et al. ............ 362/225 |
| 7,086,775 | B2 * | 8/2006 | Huang et al. ......... 362/652 |
| 2003/0112626 | A1 | 6/2003 | Yoo et al. |
| 2003/0227767 | A1 * | 12/2003 | Lee et al. ........... 362/23 |
| 2004/0156183 | A1 * | 8/2004 | Kim ................ 362/31 |

FOREIGN PATENT DOCUMENTS

| CN | 1467548 | 1/2004 |
| CN | 1521546 | 8/2004 |
| CN | 1677187 | * 10/2005 |

OTHER PUBLICATIONS

Chinese Office Action; Feb. 4, 2008 All references cited in the Foreign Office Action and not previously submitted are listed above.

* cited by examiner

*Primary Examiner*—Sandra L O'Shea
*Assistant Examiner*—Mark Tsidulko
(74) *Attorney, Agent, or Firm*—Cantor Colburn LLP

(57) ABSTRACT

A lamp-supporting unit includes a mold frame and a lamp-fixing member. The mold frame includes a bottom face, a side face upwardly extending from an edge of the bottom face, and a top face horizontally extending from an upper end of the side face and being opposite to the bottom face. The side face has openings through which lamps are moved. The lamp-fixing member is installed on the bottom face of the mold frame and fixes an end of each of the lamps.

45 Claims, 11 Drawing Sheets

LAMP-SUPPORTING UNIT, BACKLIGHT ASSEMBLY HAVING THE LAMP-SUPPORTING UNIT AND DISPLAY APPARATUS HAVING THE BACKLIGHT ASSEMBLY

This application claims priority to Korean Patent Application No. 2004-72306, filed on Sep. 9, 2004 and all the benefits accruing therefrom under 35 USC §119, and the contents of which in its entirety are herein incorporated by reference.

BACKGROUND OF THE INVENTION

1. Field of the Invention

The present invention relates to a lamp-supporting unit, a backlight assembly having the lamp-supporting unit, and a liquid crystal display ("LCD") apparatus having the backlight assembly. More particularly, the present invention relates to a lamp-supporting unit having an improved structure on which a lamp is mounted, a backlight assembly having the lamp-supporting unit, and a direct illumination type LCD apparatus having the backlight assembly.

2. Description of the Related Art

As information-processing devices have been developed, display apparatuses that interface data processed by the information-processing devices so as to have the data recognizable by a user have also been developed.

An LCD apparatus having a lightweight structure, a small size, a full-colored display, high resolution, etc., has been widely used as the display apparatus. The LCD apparatus converts variations of optical characteristics of a liquid crystal ("LC") cell into visual variations. Since the LCD apparatus does not emit a light by itself, a backlight assembly is employed in the LCD apparatus. The LCD apparatus displays an image by utilizing a light provided thereto from the backlight assembly.

The backlight assembly is classified as either a direct illumination type or an edge illumination type backlight assembly in accordance with positions of a light source. The direct illumination type backlight assembly includes a light source positioned under an LCD panel. A light emitted from the light source is directly irradiated onto an entire surface of the LCD panel. Thus, since the direct illumination type backlight assembly utilizes more light sources than those of the edge illumination type backlight assembly, the direct illumination type backlight assembly has a higher luminance than that of the edge illumination type backlight assembly.

The direct illumination type LCD apparatus includes an LCD panel displaying an image, and a backlight assembly providing the LCD panel with a light.

The backlight assembly includes at least one lamp emitting the light, a diffusion plate diffusing the light, and a reflection sheet reflecting the light toward the diffusion plate. The lamp, the diffusion plate, and the reflection sheet are received in a container.

The container includes a mold frame and a receiving member combined with the mold frame. The mold frame has a square rimmed shape. A sidewall of the mold frame substantially parallel to a length direction of the lamp is inclined at a predetermined angle.

The mold frame on which the lamp is mounted includes two mold frames. A fixing member securing an end of the lamp is arrayed in the mold frames. Also, the fixing member is fixed to the mold frame using a hook or a screw.

However, the conventional mold frame includes an L-shaped sub-frame and a U-shaped sub-frame combined with the L-shaped sub-frame. Thus, costs for manufacturing a metallic mold and the backlight assembly are increased due to the two sub-frames. Also, a process for fixing the fixing member to the mold frame using the hook or the screw is additionally carried out, thus increasing the time and cost for manufacturing the backlight assembly.

BRIEF SUMMARY OF THE INVENTION

The present invention provides a lamp-supporting unit that is assembled by simple processes.

The present invention provides a backlight assembly having the above-mentioned lamp-supporting unit.

The present invention also provides a display apparatus having the above-mentioned backlight assembly.

An exemplary embodiment of a lamp-supporting unit in accordance with the present invention includes a mold frame and a lamp-fixing member. The mold frame includes a bottom face, a side face upwardly extending from an edge of the bottom face, and a top face horizontally extending from an upper end of the side face and being opposite to the bottom face. The side face has openings through which lamps are movable. The lamp-fixing member is installed on the bottom face of the mold frame and fixes an end of each of the lamps.

Another exemplary embodiment of a backlight assembly in accordance with the present invention includes a mold frame, a lamp-fixing member, a reflection sheet, a receiving member, an optical member, and lamps. The mold frame includes a bottom face, a side face upwardly extending from an edge of the bottom face, and a top face horizontally extending from an upper end of the side face and being opposite to the bottom face. The side face has openings through which the lamps are moved. The lamp-fixing member is installed on the bottom face of the mold frame and fixes an end of each of the lamps to the mold frame. The reflection sheet reflecting light rays emitted from the lamps is positioned under the bottom face of the mold frame. The receiving member is placed under the reflection sheet and receives the reflection sheet therein. The optical member diffusing the light rays is arrayed over the top face of the mold frame. The lamps emit the light rays toward the optical member.

Still another exemplary embodiment of a backlight assembly in accordance with the present invention includes a mold frame, a lamp-fixing member, a reflection sheet, a receiving member, an optical member, and lamps. The mold frame includes a bottom face, a first side face upwardly extending from a first edge of the bottom face, a second side face upwardly extending from a second edge of the bottom face opposite to the first edge and opposite to the first side face, and a top face horizontally extending between upper ends of the first and second side faces and opposite to the bottom face. The first side face has openings through which lamps are moved. The openings extend from a lower end of the first side face. The lamp-fixing member is installed on the bottom face of the mold frame and fixes an end of each of the lamps to the mold frame. The reflection sheet reflecting light rays emitted from the lamps is positioned under the bottom face of the mold frame. The receiving member is placed under the reflection sheet and receives the reflection sheet therein. The optical member diffusing the light rays is arrayed over the top face of the mold frame. The lamps emit the light rays toward the optical member.

Yet still another exemplary embodiment of a backlight assembly in accordance with the present invention includes a mold frame, a lamp-fixing member, a reflection sheet, a receiving member, an optical member, and lamps. The mold frame includes a bottom face, a first side face upwardly extending from a first edge of the bottom face, a second side face upwardly extending from a second edge of the bottom face opposite to the first edge and opposite to the first side face, and a top face horizontally extending between upper ends of the first and second side faces and opposite to the bottom face. The first side face has openings through which lamps are moved. The openings extend from a lower end of the first side face. The lamp-fixing member is installed on the bottom face of the mold frame and fixes an end of each of the lamps to the mold frame. The reflection sheet reflecting light rays emitted from the lamps is positioned on a plane substantially identical to a plane on which the bottom face of the mold frame is positioned and makes contact with the bottom face of the mold frame. The receiving member is placed under the reflection sheet and receives the reflection sheet therein. The optical member diffusing the light rays is arrayed over the top face of the mold frame. The lamps emit the light rays toward the optical member.

An exemplary embodiment of an LCD apparatus in accordance with the present invention includes an LCD panel that includes a lower substrate, an upper substrate, and an LC layer interposed between the lower and upper substrates, and a backlight assembly providing light rays to the LCD panel. The LCD panel displays an image using the light. The backlight assembly includes a mold frame, a lamp-fixing member, a reflection sheet, a receiving member, an optical member, and lamps. The mold frame includes a bottom face, a first side face upwardly extending from a first edge of the bottom face, and a top face horizontally extending from the upper end of the first side face and being opposite to the bottom face. The mod frame may further include a second side face upwardly extending from a second edge of the bottom face opposite to the first edge and opposite to the first side face, and the top face may horizontally extend between the upper ends of the first and second side faces. The first side face has openings through which lamps are moved. The lamp-fixing member is installed on the bottom face of the mold frame and fixes an end of each of the lamps to the mold frame. The reflection sheet reflecting light rays emitted from the lamps is positioned on a plane substantially identical to that on which the bottom face of the mold frame is positioned and makes contact with the bottom face of the mold frame. Alternatively, the reflection sheet includes a bottom sheet positioned under the bottom face of the mold frame, and side sheets extending from edges of the bottom sheet. The receiving member is placed under the reflection sheet and receives the reflection sheet therein. The optical member diffusing the light rays is arrayed over the top face of the mold frame. The lamps emit the light rays toward the optical member.

Another exemplary embodiment of a lamp-supporting unit in accordance with the present invention includes a mold frame including a bottom face, the bottom face formed of an elastic material and a lamp-fixing member elastically held to the mold frame by the bottom face.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
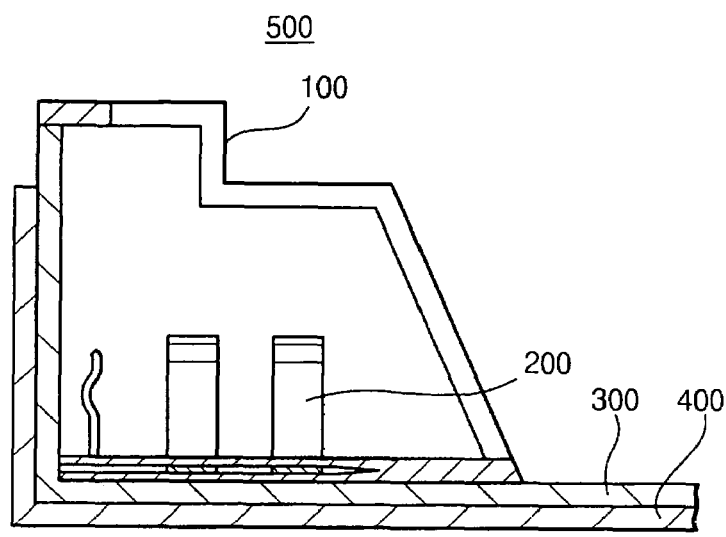
FIG. 1 is a cross sectional view illustrating an exemplary embodiment of a lamp-supporting unit in accordance with the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
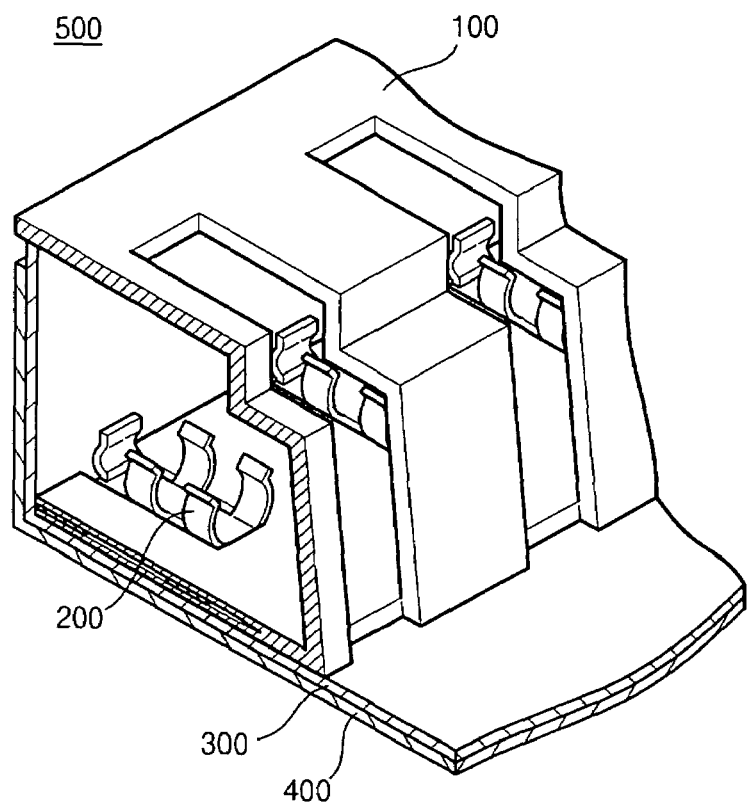
FIG. 2 is a perspective view illustrating the exemplary lamp-supporting unit in FIG. 1.
Figure 3:
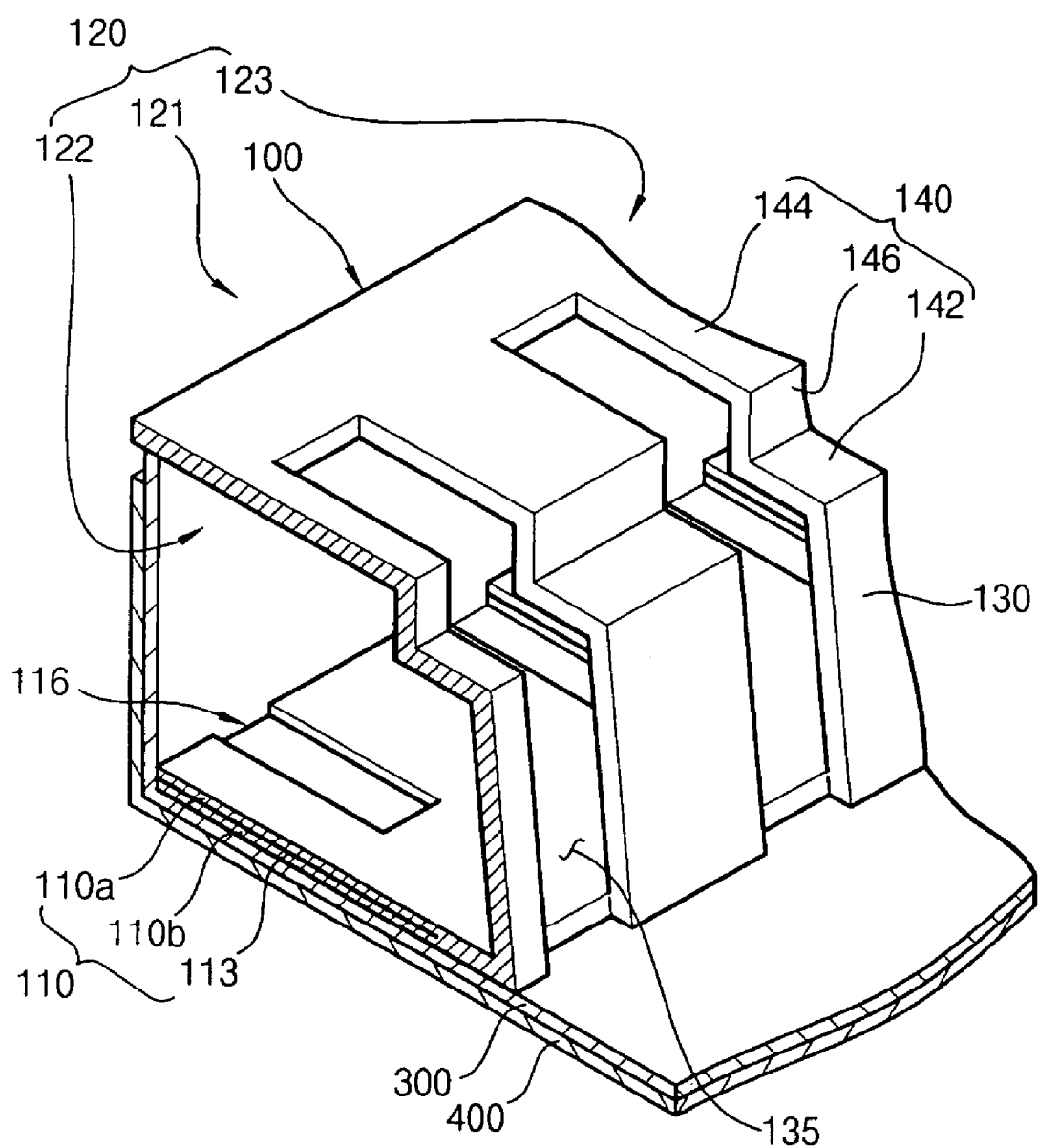
FIG. 3 is a perspective view illustrating an exemplary mold frame in FIG. 2.
Figure 6:
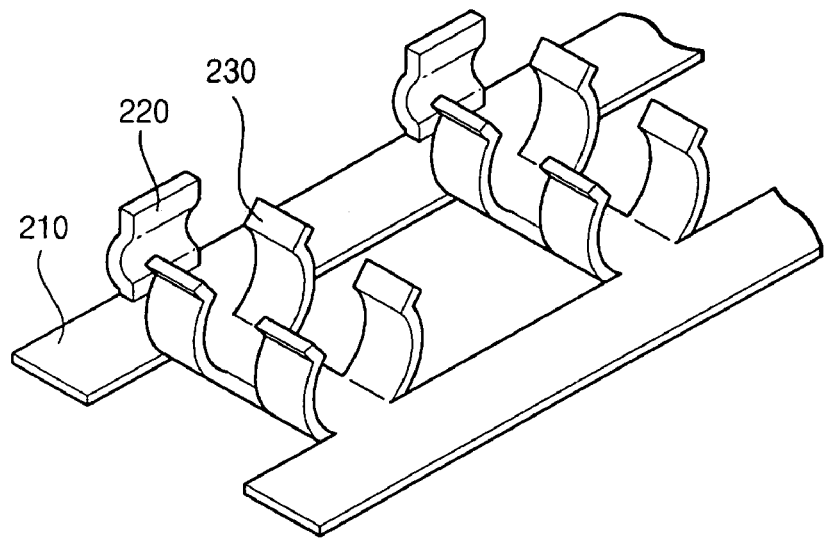
FIG. 6 is a perspective view illustrating the exemplary lamp-fixing member in FIG. 2.
Figure 7:
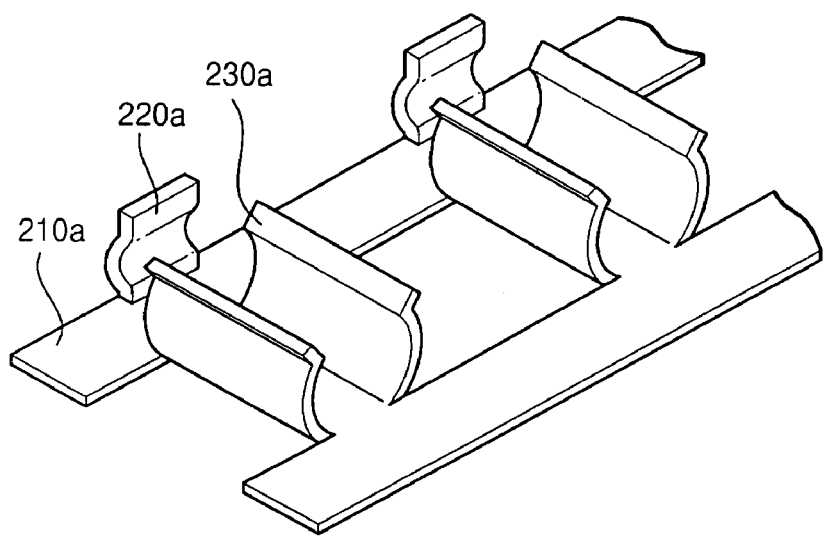
FIG. 7 is a perspective view illustrating another exemplary embodiment of a lamp-fixing member for a lamp-supporting unit in accordance with the present invention.

FIG. 1 is a cross sectional view illustrating an exemplary embodiment of a lamp-supporting unit in accordance with the present invention, FIG. 2 is a perspective view illustrating the lamp-supporting unit in FIG. 1, FIG. 3 is a perspective view illustrating an exemplary mold frame in FIG. 2, FIG. 6 is a perspective view illustrating an exemplary lamp-fixing member in FIG. 2, and FIG. 7 is a perspective view illustrating another exemplary lamp-fixing member for a lamp-supporting unit in accordance with the present invention.

Referring to FIGS. 1 to 3, a lamp-supporting unit 500 includes a mold frame 100, a lamp-fixing member 200, a reflection sheet 300, and a receiving member 400.

As illustrated in FIG. 3, the mold frame 100 includes a bottom face 110, a side face 130, and a top face 140. The side face 130 upwardly extends from a first edge of the bottom face 110, such as at a non-perpendicular angle to the bottom face 110. Thus, the mold frame 100 has a three-sided opened side face 120. The opened side face 120 includes a first opened side face 121 facing the side face 130, and second and third opened side faces 122 and 123 substantially perpendicular to the side face 130. The second opened side face 122 faces the third opened side face 123. The top face 140 horizontally extends from an upper end of the side face 130 to an upper end of the first opened side face 121.

The side face 130 has openings 135 through which lamps are moved, such as during assembly or lamp replacement. The number of openings 135 may be equal to a number of lamps supported within the lamp-supporting unit 500. The openings 135 are sized for receiving a lamp there through, and therefore have a width at least slightly greater than a diameter of a lamp. The top face 140 includes a first horizontal portion 142 horizontally extending from the upper end of the side face 130, a stepped portion 146 vertically extending from the first horizontal portion 142, and a second horizontal portion 144 horizontally extending from the stepped portion 146. Thus, the first horizontal portion 142 has a height lower than that of the second horizontal portion 144, with respect to the bottom face 110. That is, a distance between the bottom face 110 and the first is horizontal portion 142 is less than a distance between the bottom face 110 and the second horizontal portion 144.

For allowing ends of the lamps to be vertically moved through the openings 135, the openings 135 are also formed through the first and second horizontal portions 142 and 144 and the stepped portion 146. Thus, such as during assembly or lamp replacement, the lamps are downwardly moved through the openings 135 in a vertical direction and are then secured to the lamp-fixing member 200. Thus, a top down assembly procedure is made possible. The ends of the lamps correspond to an external electrode of the lamps.

The bottom face 110 includes an elastic material. The bottom face 110 is cut in the horizontal direction from a second edge of the bottom face 110, from where the first opened side face 121 extends, opposite to the first edge, from where the side face 130 extends, to form a cut space 113. Thus, the cut space 113 divides the bottom face 110 into an upper first bottom portion 110a and a lower second bottom portion 110b positioned under the first bottom portion 110a. Also, a groove 116 is formed at a second edge portion of the first bottom portion 110a, but not through the second bottom portion 110b. There may be as many or more grooves 116 as there are lamps to be supported by the lamp-fixing member 200. The lamp-fixing member 200 is received in the groove 116. Since the bottom face 110 includes the elastic material, the cut space 113 is broadened when two forces are upwardly and downwardly applied to the first and second bottom portions 110a and 110b, respectively. Thus, after portions of the lamp-fixing member 200 are slidably inserted into the broadened cut space 113, the forces applied to the first and second bottom portions 110a and 110b are released. The first and second bottom portions 110a and 110b having elasticity are then returned to original positions to firmly secure the portions of the lamp-fixing member 200 there between, with other portions of the lamp fixing member 200 extending outwardly from the groove 116.

Referring to FIG. 6, the lamp-fixing member 200 includes a base 210, at least one supporting plate 220 that is formed on the base 210 and supports an end of the lamp, and, as illustrated, two clips 230 that are formed on the base 210 and elastically hold the lamp. To vertically insert the lamp into the clips 230, the clips 230 have opened upper portions. Thus, each of the clips 230 includes a pair of clipping members opposite to each other. The lamp-fixing member 200 holds an end of the lamp, and applies an external power to the end of the lamp. The lamp-fixing member 200 may include a conductive material. The base 210 of the lamp-fixing member 200 is slidably inserted into the cut space 113 as the clips 230 are received in the grooves 116. Here, the numbers of the supporting plate 220 and the clips 230 correspond to numbers of the lamps. Alternatively, the light-fixing member 200 may include at least three clip pairs 230 per supporting plate 220, instead of the illustrated two clip pairs 230.

Alternatively, as shown in FIG. 7, a lamp-fixing member 200a may include a base 210a, a supporting plate 220a that is formed on the base 210a, and a single clip 230a that is formed on the base 210a. That is, the clip 230a has a structure that is formed by uniting the two clips 230 as shown in FIG. 6 with each other. Thus, the single clip 230a may secure the lamp firmer compared with the two clips 230, since the clip pair 230a has wider clipping members than the clips 230.

The reflection sheet 300 includes a bottom sheet positioned under the bottom face 110 of the mold frame 100, and three side sheets upwardly extending from edges of the bottom sheet. The three side sheets of the reflection sheet 300 enclose the opened side faces 121, 122 and 123 of the mold frame 100, respectively. To electrically isolate the lamp-fixing member 200, the side sheets of the reflection sheet 300 may include an insulation material.

The receiving member 400 is arrayed under the reflection sheet 300. The mold frame 100 having the lamp-fixing member 200 and the reflection sheet 300 are received in the receiving member 400. The receiving member 400 may also include side surfaces extending upwardly from edges of a bottom portion of the receiving member 400, thus defining a receiving space therein.

Figure 4:
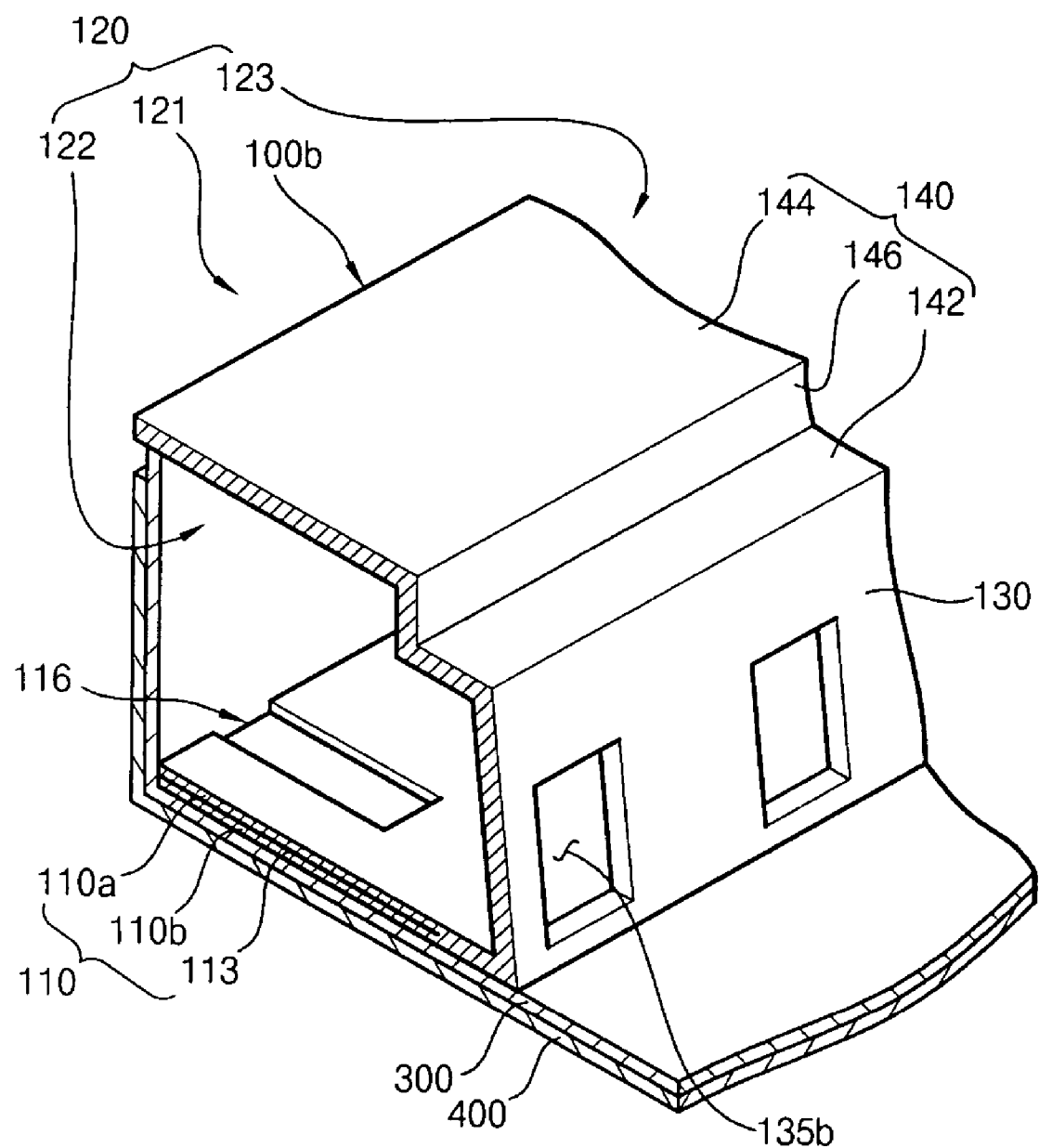
FIG. 4 is a perspective view illustrating another exemplary embodiment of a mold frame of a lamp-supporting unit in accordance with the present invention.
Figure 8:
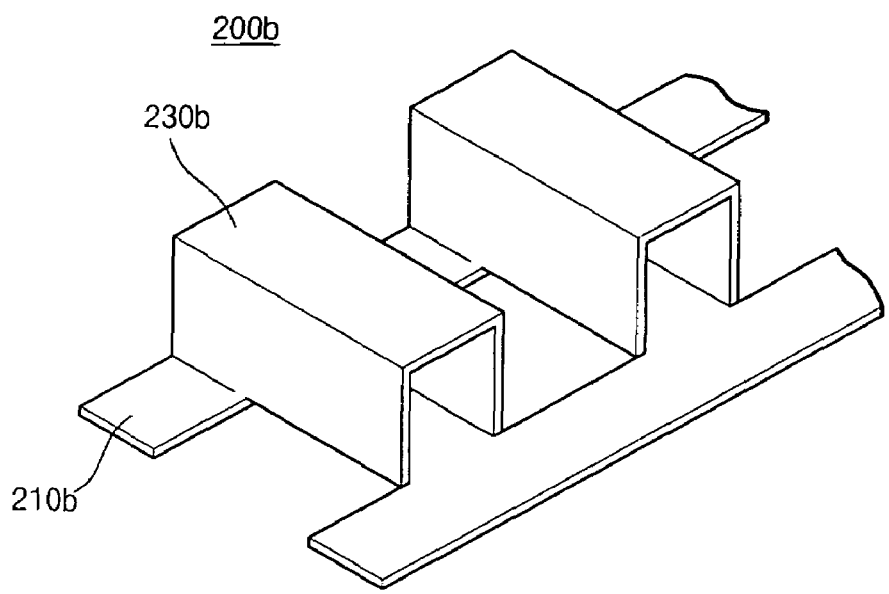
FIG. 8 is a perspective view illustrating an exemplary embodiment of a lamp-fixing member for the lamp-supporting unit in FIG. 4.

FIG. 4 is a perspective view illustrating an exemplary embodiment of a mold frame of a lamp-supporting unit in accordance with the present invention, and FIG. 8 is a perspective view illustrating an exemplary embodiment of a lamp-fixing member for use with the lamp-supporting unit in FIG. 4.

Referring to FIGS. 4 and 8, a mold frame 100b includes a bottom face 110, a side face 130, and a top face 140. The side face 130 upwardly extends from a first edge of the bottom face 110. Thus, the mold frame 100b has a three-sided opened side face 120. The opened side face 120 includes a first opened side face 121 facing the side face 130, and second and third opened side faces 122 and 123 substantially perpendicular to the side face 130. The second opened side face 122 faces the third opened side face 123. The top face 140 horizontally extends from an upper end of the side face 130 to an upper end of the first opened side face 121.

The side face 130 has openings 135b having rectangular shapes through which lamps having a rectangular parallelepiped shape are moved, such as during assembly or lamp replacement. The number of openings 135b may be equal to a number of lamps supported within the lamp-supporting unit. The openings 135b are sized for receiving a lamp there through, and therefore have a size at least slightly greater than a size of the rectangular parallelepiped shaped lamp. The side face 130 is slanted toward the lamp with respect to a vertical face of the bottom face 110, that is, the side face 130 forms a non-perpendicular angle with the bottom face 110.

The top face 140 includes a first horizontal portion 142 horizontally extending from the upper end of the side face 130, a stepped portion 146 vertically extending from the first horizontal portion 142, and a second horizontal portion 144 horizontally extending from the stepped portion 146. Thus, the first horizontal portion 142 has a height lower than that of the second horizontal portion 144, with respect to the bottom face 110. That is, a distance between the bottom face 110 and the first horizontal portion 142 is less than a distance between the bottom face 110 and the second horizontal portion 144.

The bottom face 110 includes an elastic material. The bottom face 110 is cut in the horizontal direction from a second edge of the bottom face 110, from where the first opened side face 121 extends, opposite to the first edge, from where the side face 130 extends, to form a cut space 113. Thus, the cut space 113 divides the bottom face 110 into an upper first bottom portion 110a and a lower second bottom portion 110b positioned under the first bottom portion 110a. Also, a groove 116 is formed at a second edge portion of the first bottom portion 110a, but not through the second bottom portion 110b. There may be as many or more grooves 116 as there are lamps to be supported by the lamp-fixing member 200. A lamp-fixing member 200b as shown in FIG. 8 is received in the groove 116. Since the bottom face 110 includes the elastic material, the cut space 113 is broadened when two forces are upwardly and downwardly applied to the first and second bottom portions 110a and 110b, respectively. Thus, after portions of the lamp-fixing member 200b are slidably inserted into the broadened cut space 113, the forces applied to the first and second bottom portions 110a and 110b are released. The first and second bottom portions 110a and 110b having elasticity are then returned to original positions to firmly secure the portions of the lamp-fixing member 200b there between, with portions of the lamp fixing member 200b extending outwardly from the grooves 116.

Referring to FIG. 8, the lamp-fixing member 200b includes a base 210b, and clips 230b that are formed on the base 210b and elastically hold the lamp. The clips 230b have a rectangular parallelepiped shape having an opened end and a closed end. The lamps are inserted into the clips 230b through the opened end. The closed end of the clips 230b supports ends of the lamps. Also, the clips 230b have a height from the bottom face 110 substantially identical to that of the openings 135b. Thus, the lamps are horizontally inserted into the clips 230b through the openings 135b in the mold frame 100b. The lamp-fixing member 200b holds ends of the lamps, and applies an external power to the end of each lamp. The lamp-fixing member 200b may include a conductive material. The base 210b of the lamp-fixing member 200b is slidably inserted into the cut space 113 as the clips 230b are received in the grooves 116. Here, the numbers of the clips 230 correspond to numbers of the lamps.

The reflection sheet 300 includes a bottom sheet positioned under the bottom face 110 of the mold frame 100b, and three side sheets upwardly extending from edges of the bottom sheet. The three side sheets of the reflection sheet 300 enclose the opened side faces 121, 122 and 123 of the mold frame 100b, respectively. To electrically isolate the lamp-fixing member 200b, the side sheets of the reflection sheet 300 may include an insulation material.

A receiving member 400 is arrayed under the reflection sheet 300. The mold frame 100b having the lamp-fixing member 200b and the reflection sheet 300 are received in the receiving member 400. The receiving member 400 may also include side surfaces extending upwardly from edges of a bottom portion of the receiving member 400, thus defining a receiving space therein.

Figure 5:
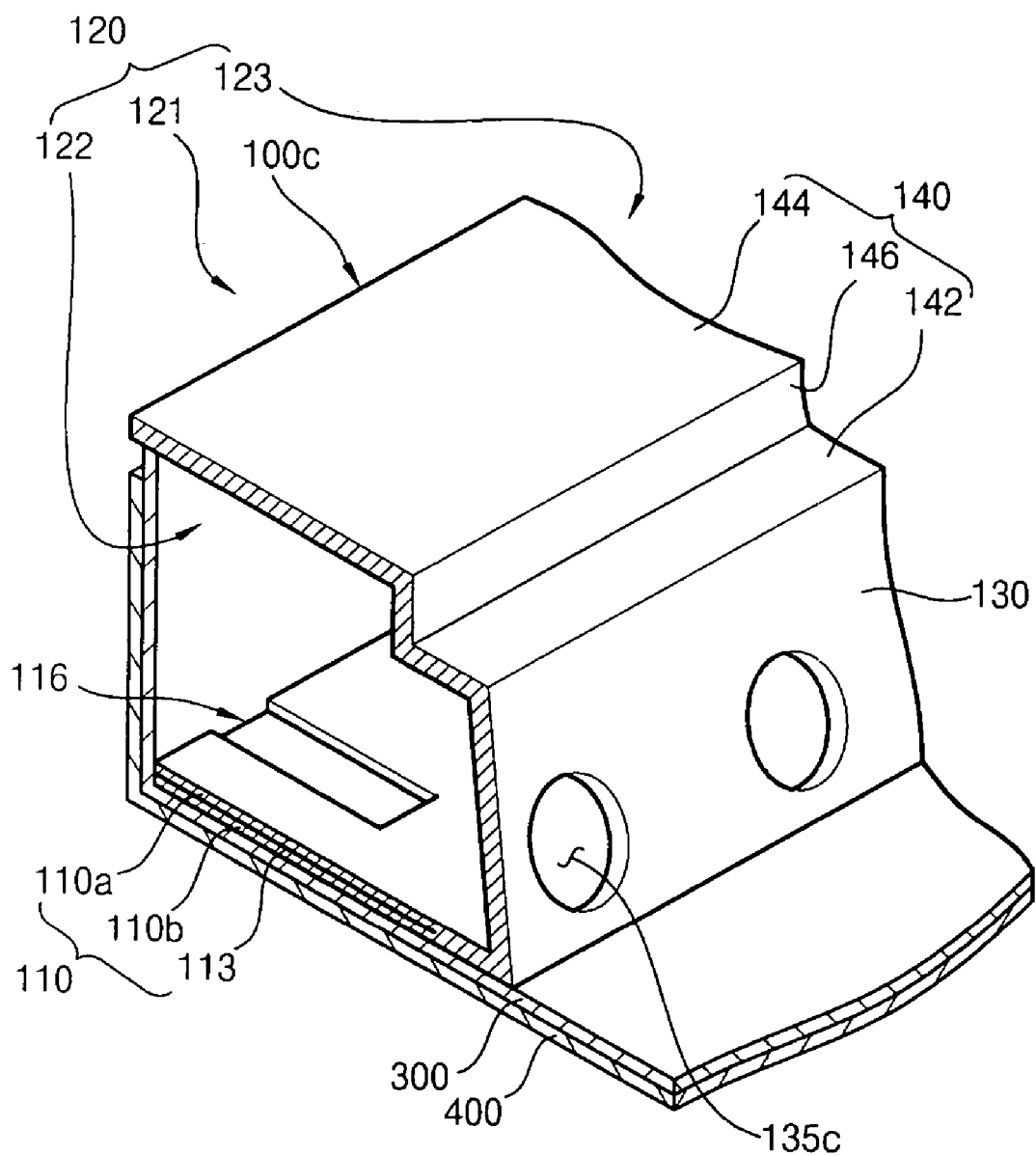
FIG. 5 is a perspective view illustrating another exemplary embodiment of a mold frame of a lamp-supporting unit in accordance with the present invention.
Figure 9:
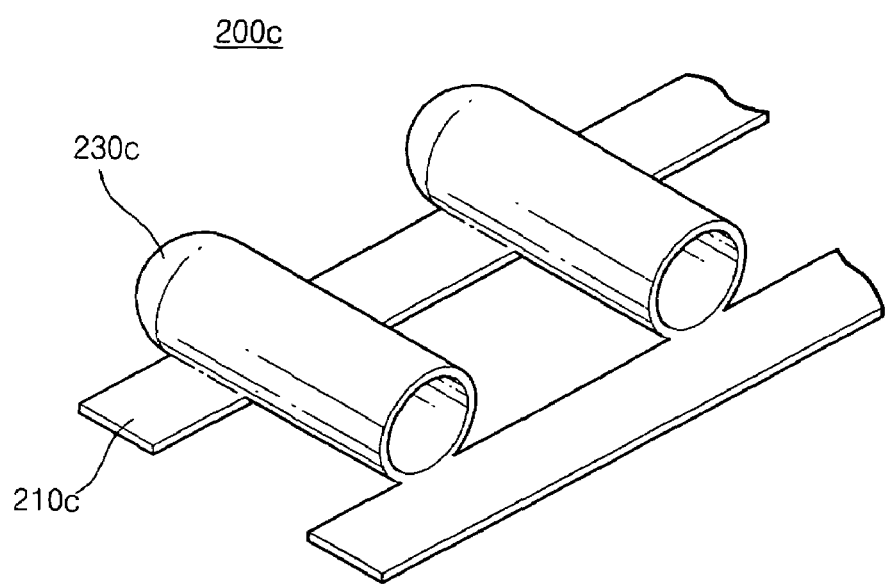
FIG. 9 is a perspective view illustrating an exemplary embodiment of a lamp-fixing member for the lamp-supporting unit in FIG. 5.

FIG. 5 is a perspective view illustrating an exemplary embodiment of a mold frame of a lamp-supporting unit in accordance with the present invention, and FIG. 9 is a perspective view illustrating an exemplary lamp-fixing member for use with the lamp-supporting unit in FIG. 5.

Referring to FIGS. 5 and 9, a mold frame 100c includes a bottom face 110, a side face 130, and a top face 140. The side face 130 upwardly extends from a first edge of the bottom face 110. Thus, the mold frame 100c has a three-sided opened side face 120. The opened side face 120 includes a first opened side face 121 facing the side face 130, and second and third opened side faces 122 and 123 substantially perpendicular to the side face 130. The second opened side face 122 faces the third opened side face 123. The top face 140 horizontally extends from an upper end of the side face 130 to an upper end of the first opened side face 121.

The side face 130 has openings 135c having circular shapes through which lamps having a cylindrical shape are moved such as during assembly or lamp replacement. The number of openings 135c may be equal to a number of lamps supported within the lamp-supporting unit. The openings 135c are sized for receiving a lamp there through, and therefore have a diameter at least slightly greater than a diameter of a lamp. The top face 140 includes a first horizontal portion 142 horizontally extending from the upper end of the side face 130, a stepped portion 146 vertically extending from the first horizontal portion 142, and a second horizontal portion 144 horizontally extending from the stepped portion 146. Thus, the first horizontal portion 142 has a height lower than that of the second horizontal portion 144, with respect to the bottom face 110. That is, a distance between the bottom face 110 and the first horizontal portion 142 is less than a distance between the bottom face 110 and the second horizontal portion 144.

The bottom face 110 includes an elastic material. The bottom face 110 is cut in the horizontal direction from a second edge of the bottom face 110, from where the first opened side face 121 extends, opposite to the first edge, from where the side face 130 extends, to form a cut space 113. Thus, the cut space 113 divides the bottom face 110 into an upper first bottom portion 110a and a lower second bottom portion 110b positioned under the first bottom portion 110a. Also, a groove 116 is formed at a second edge portion of the first bottom portion 110a, but not through the second bottom portion 110b. There may be as many or more grooves 116 as there are lamps to be supported by a lamp fixing member 200c. A lamp-fixing member 200c, as shown in FIG. 9, is received in the groove 116. Since the bottom face 110 includes the elastic material, the cut space 113 is broadened when two forces are upwardly and downwardly applied to the first and second bottom portions 110a and 110b, respectively. Thus, after portions of the lamp-fixing member 200c are slidably inserted into the broadened cut space 113, the forces applied to the first and second bottom portions 110a and 110b are released. The first and second bottom portions 110a and 110b having elasticity are then returned to original positions to firmly secure the portions of the lamp-fixing member 200c there between, with other portions of the lamp fixing member 200c extending outwardly from the groove 116.

Referring to FIG. 9, the lamp-fixing member 200c includes a base 210c, and clips 230c that are formed on the base 210c and elastically hold the lamp.

The clips 230c have a cylindrical shape having an opened end and a closed end. The lamps are inserted into the clips 230c through the opened end. The closed end of the clips 230c supports ends of the lamps. Also, the clips 230c have a height from the bottom face 110 substantially identical to that of the openings 135c. Thus, the lamps are horizontally inserted into the clips 230c through the openings 135c in the mold frame 100c. The lamp-fixing member 200c holds ends of the lamps, and applies an external power to the end of each lamp. The lamp-fixing member 200c may include a conductive material. The base 210c of the lamp-fixing member 200c is slidably inserted into the cut space 113 as the clips 230c are received in the grooves 116. Here, the numbers of the clips 230c correspond to numbers of the lamps.

The reflection sheet 300 includes a bottom sheet positioned under the bottom face 110 of the mold frame 100c, and three side sheets upwardly extending from edges of the bottom sheet. The three side sheets of the reflection sheet 300 enclose the opened side faces 121, 122 and 123 of the mold frame 100c, respectively. To electrically isolate the lamp-fixing member 200c, the side sheets of the reflection sheet 300 may include an insulation material.

A receiving member 400 is arrayed under the reflection sheet 300. The mold frame 100c having the lamp-fixing member 200c and the reflection sheet 300 are received in the receiving member 400. The receiving member 400 may also include side surfaces extending upwardly from edges of a bottom portion of the receiving member 400, thus defining a receiving space therein.

Figure 10:
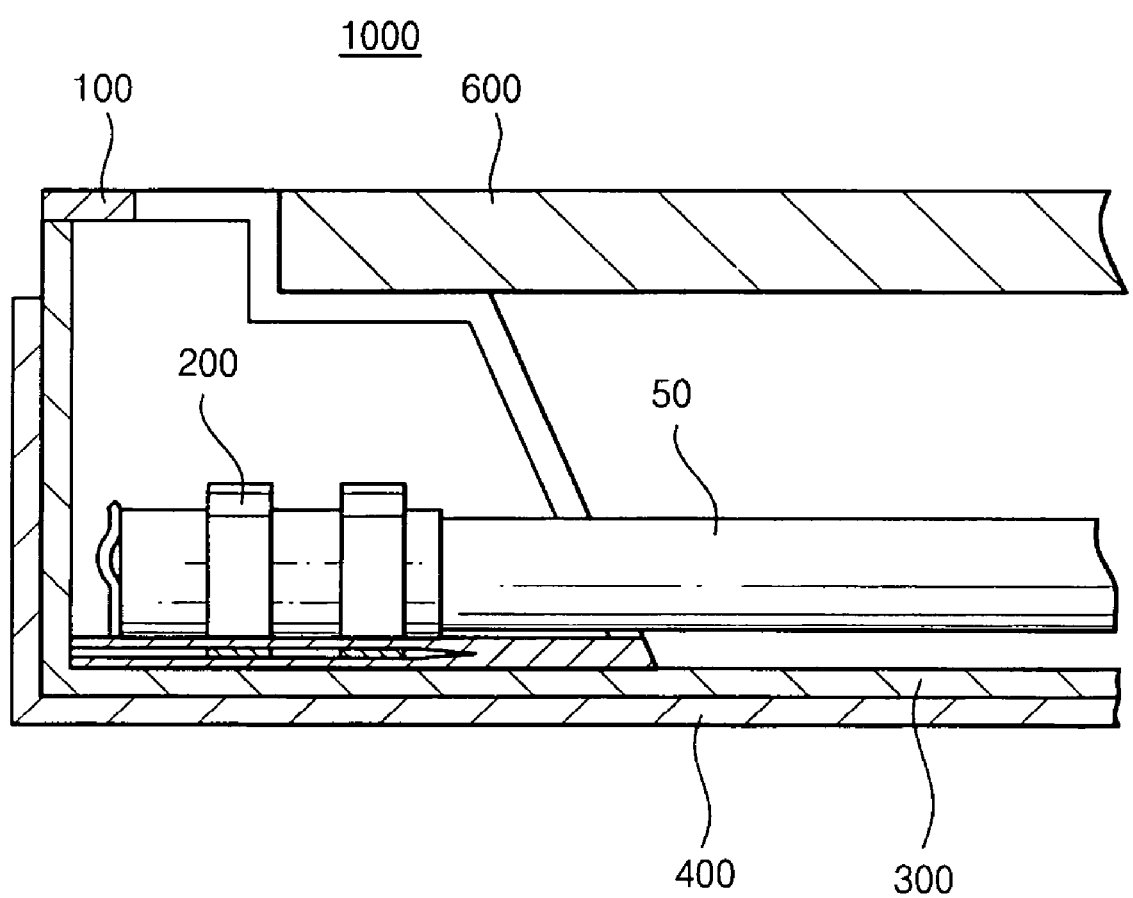
FIG. 10 is a cross sectional view illustrating an exemplary embodiment of a backlight assembly in accordance with the present invention.
Figure 11:
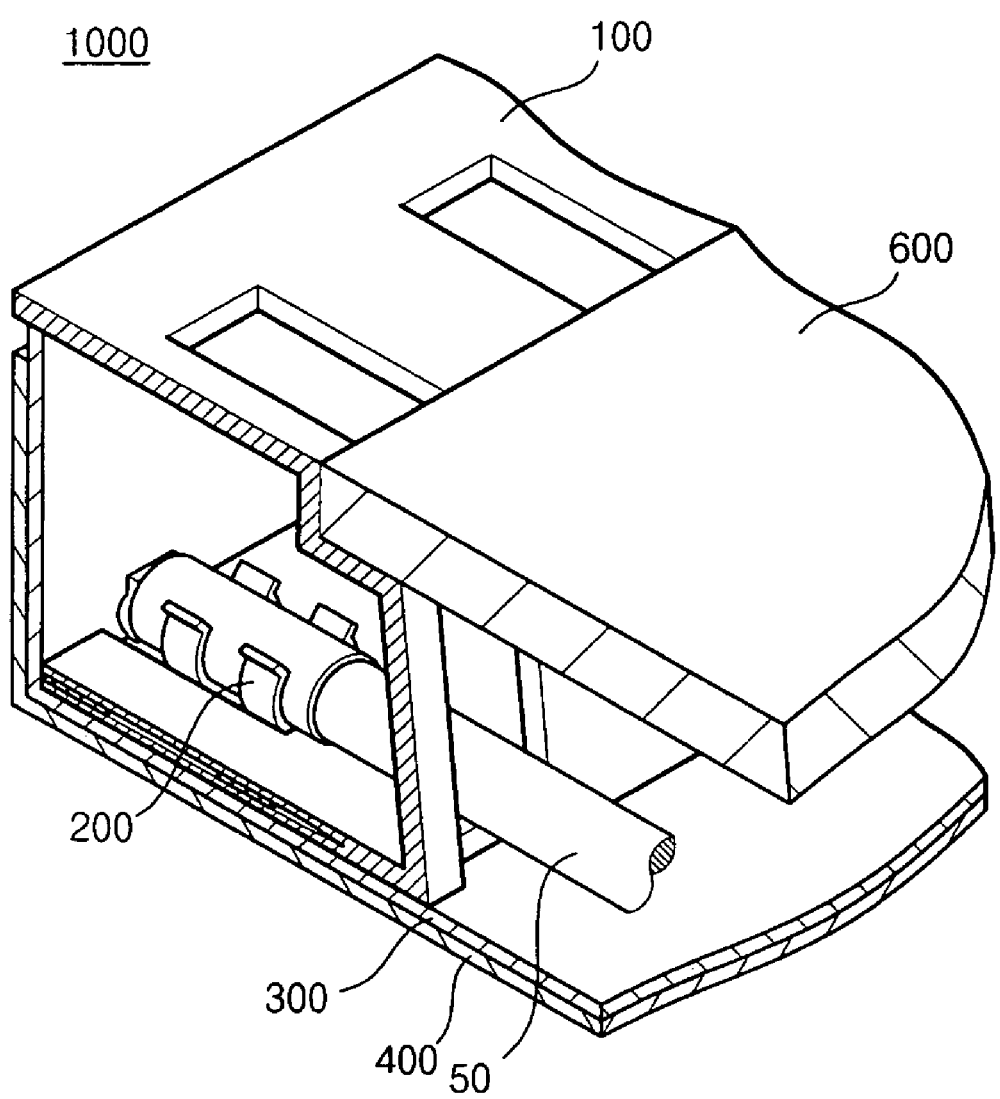
FIG. 11 is a perspective view illustrating the backlight assembly in FIG. 10.

FIG. 10 is a cross sectional view illustrating an exemplary embodiment of a backlight assembly in accordance with the present invention, and FIG. 11 is a perspective view illustrating the backlight assembly in FIG. 10.

Referring to FIGS. 10 and 11, a backlight assembly 1000 includes a mold frame 100, a lamp-fixing member 200, a reflection sheet 300, a receiving member 400, an optical member 600, and lamps 50.

As described with respect to FIG. 3, the mold frame 100 includes a bottom face 110, a side face 130, and a top face 140. The side face 130 upwardly extends from a first edge of the bottom face 110. Thus, the mold frame 100 has a three-sided opened side face 120. The opened side face 120 includes a first opened side face 121 facing the side face 130, and second and third opened side faces 122 and 123 substantially perpendicular to the side face 130. The second opened side face 122 faces the third opened side face 123. The top face 140 horizontally extends from an upper end of the side face 130 to an upper end of the first opened side face 121.

The side face 130 has openings 135 through which lamps 50 are moved, such as during assembly or lamp replacement. The number of openings 135 may be equal to a number of lamps supported within the lamp-supporting unit. The openings 135 are sized for receiving a lamp 50 there through, and therefore have a width at least slightly greater than a diameter of a lamp 50. The top face 140 includes a first horizontal portion 142 horizontally extending from the upper end of the side face 130, a stepped portion 146 vertically extending from the first horizontal portion 142, and a second horizontal portion 144 horizontally extending from the stepped portion 146. Thus, the first horizontal portion 142 has a height lower than that of the second horizontal portion 144, with respect to the bottom face 110. That is, a distance between the bottom face 110 and the first horizontal portion 142 is less than a distance between the bottom face 110 and the second horizontal portion 144.

For allowing ends of the lamps 50 to be vertically moved through the openings 135, the openings 135 are also formed through the first and second horizontal portions 142 and 144 and the stepped portion 146. Thus, such as during assembly or lamp replacement, the lamps 50 are downwardly moved through the openings 135 in a vertical direction and are then secured to the lamp-fixing member 200. The lamps 50 may correspond to an external electrode lamp or an internal electrode lamp.

The bottom face 110 includes an elastic material. The bottom face 110 is cut in the horizontal direction from a second edge of the bottom face 110, from where the first opened side face 121 extends, opposite to the first edge, from where the side face 130 extends, to form a cut space 113. Thus, the cut space 113 divides the bottom face 110 into an upper first bottom portion 110a and a second lower bottom portion 110b positioned under the first bottom portion 110a. Also, a groove 116 is formed at a second edge portion of the first bottom portion 110a, but not through the second bottom portion 110b. There may be as many or more grooves 116 as there are lamps to be supported by the lamp-fixing member 200. The lamp-fixing member 200 is received in the groove 116. Since the bottom face 110 includes the elastic material, the cut space 113 is broadened when two forces are upwardly and downwardly applied to the first and second bottom portions 110a and 110b, respectively. Thus, after portions of the lamp-fixing member 200 are slidably inserted into the broadened cut space 113, the forces applied to the first and second bottom portions 110a and 110b are released. The first and second bottom portions 110a and 110b having elasticity are then returned to original positions to firmly secure the portions of the lamp-fixing member 200 there between, with other portions of the lamp fixing member 200 extending outwardly from the groove 116.

The lamp-fixing member 200, such as illustrated in FIG. 6, includes a base 210, at least one supporting plate 220 that is formed on the base 210 and supports the end of the lamp 50, and clips 230 that are formed on the base 210 and elastically hold the lamp 50. To vertically insert the lamp into the clips 230, the clips 230 have opened upper portions. Thus, each of the clips 230 includes a pair of clipping members opposite to each other. The lamp-fixing member 200 holds an end of the lamp, and applies an external power to the end of the lamp. The lamp-fixing member 200 may include a conductive material. The base 210 of the lamp-fixing member 200 is slidably inserted into the cut space 113 as the clips 230 are received in the grooves 116. Here, the numbers of the supporting plate 220 and the clips 230 correspond to those of the lamps 50. Alternatively, the light-fixing member 200 may include at least three clip pairs 230 per supporting plate 220. While the backlight assembly 1000 is described as incorporating the lamp-fixing member 200, it should be understood that alternate embodiments of the lamp-fixing member as described herein may also be employed within such a backlight assembly 1000.

The reflection sheet 300 includes a bottom sheet positioned under the bottom face 110 of the mold frame 100, and three side sheets upwardly extending from edges of the bottom sheet. The three side sheets of the reflection sheet 300 enclose the opened side faces 121, 122, 123 of the mold frame 100. To electrically isolate the lamp-fixing member 200, the side sheets of the reflection sheet 300 may include an insulation material.

The receiving member 400 is arrayed under the reflection sheet 300. The mold frame 100 having the lamp-fixing member 200 and the reflection sheet 300 are received in the receiving member 400. The receiving member 400 may also include side surfaces extending upwardly from edges of a bottom portion of the receiving member 400, thus defining a receiving space therein.

After the lamps 50 are inserted through the mold frame 100 and fixed by the lamp fixing member 200, the optical member 600 is placed on the first horizontal portion 142 of the top face 140. A side face of the optical member 600 closely makes contact with the stepped portion 146 of the top face 140. A top surface of the optical member 600 may be flushly aligned with the second horizontal portion 144. The optical member 600 improves characteristics of light rays emitted from the lamps 50. The optical member 600 includes a diffusion plate. Optical sheets such as a prism sheet (not shown), a diffusion sheet (not shown), etc., may be positioned on the diffusion plate.

Figure 12:
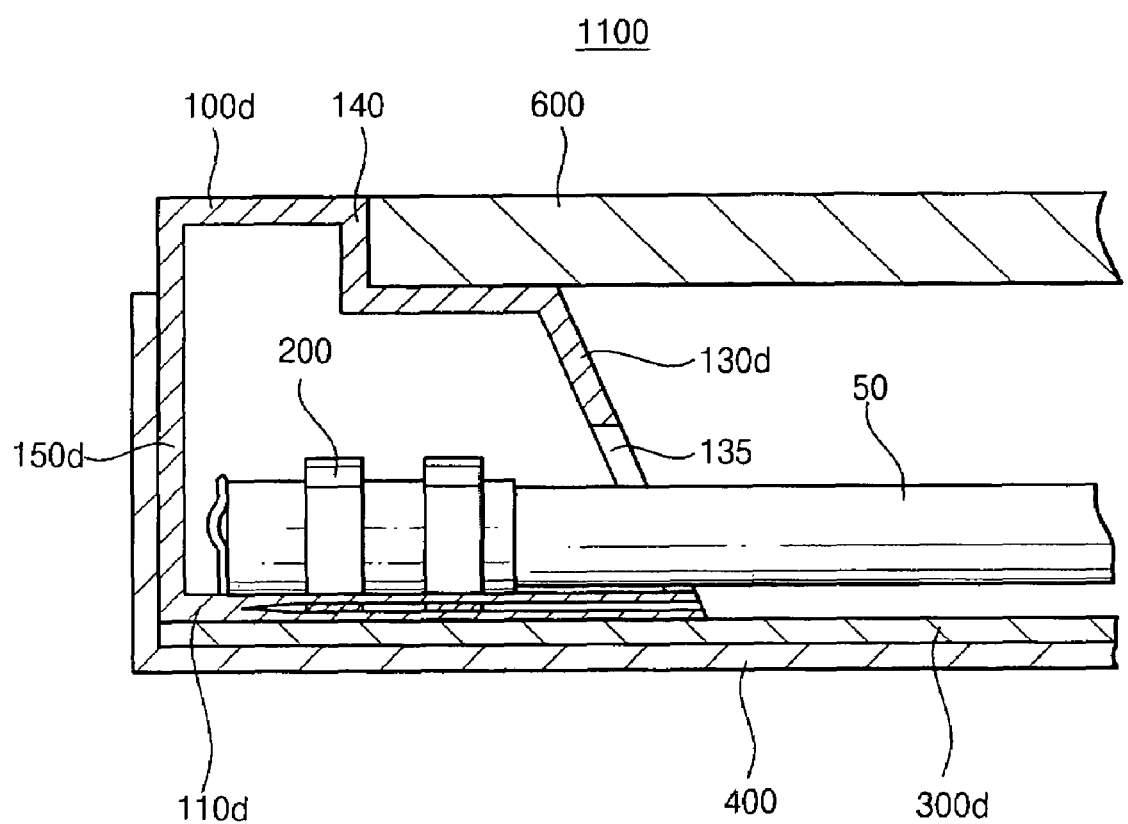
FIG. 12 is a cross sectional view illustrating another exemplary embodiment of a backlight assembly in accordance with the present invention.

FIG. 12 is a cross sectional view illustrating an exemplary embodiment of a backlight assembly in accordance with the present invention.

A backlight assembly 1100 includes elements substantially identical to those of the backlight assembly 1000 except for a mold frame and a reflection sheet. Thus, any further illustrations with respect to the elements are omitted herein.

Referring to FIG. 12, a backlight assembly 1100 includes a mold frame 100d, a lamp-fixing member 200, a reflection sheet 300d, a receiving member 400, an optical member 600, and lamps 50.

The mold frame 100d includes a bottom face 110d, a first side face 130d, a second side face 150d, and a top face 140. The first side face 130d upwardly extends from a first edge of the bottom face 110. The second side face 150d vertically extends from a second edge of the bottom face 110. Thus, the second side face 150d is opposite to the first side face 130d. The top face 140 horizontally extends from an upper end of the first side face 130d to an upper end of the second side face 150d. The first side face 130d has openings 135 through which lamps 50 are moved. Also, a cut space, similar to cut space 113 of the prior embodiments, is formed from the first edge of the bottom face 110d, instead of from the second edge as in the prior embodiments.

The reflection sheet 300d is interposed between the bottom face 110d of the mold frame 100d and the receiving member 400. As illustrated, the reflection sheet 300d does not include an upwardly extending side sheet to enclose an opened side face 121 as that side of the mold frame 100d is instead enclosed by the second side face 150d.

Figure 13:
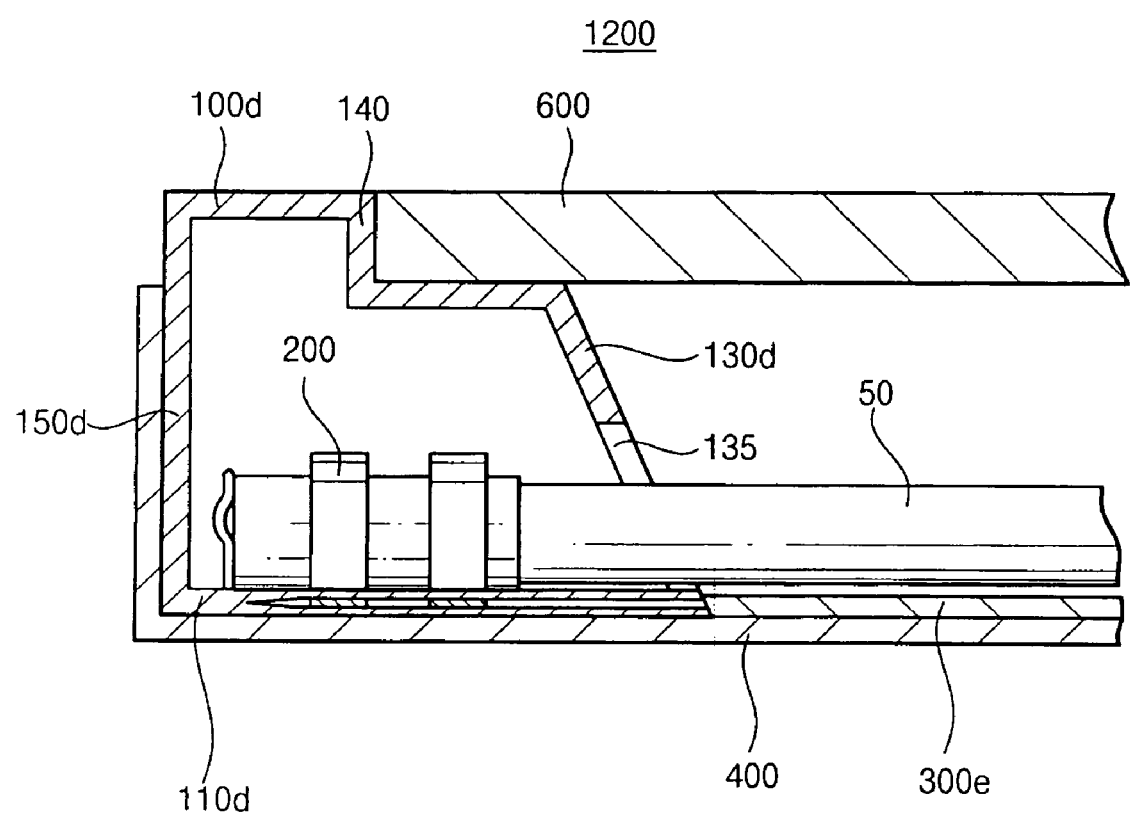
FIG. 13 is a cross sectional view illustrating another exemplary embodiment of a backlight assembly in accordance with the present invention.

FIG. 13 is a cross sectional view illustrating an exemplary embodiment of a backlight assembly in accordance with the present invention.

A backlight assembly 1200 includes elements substantially identical to those of the backlight assembly 1100 except for a reflection sheet. Thus, any further illustrations with respect to the elements are omitted herein.

Referring to FIG. 13, a backlight assembly 1200 includes a mold frame 100d, a lamp-fixing member 200, a reflection sheet 300e, a receiving member 400, an optical member 600, and lamps 50.

The mold frame 100d includes a bottom face 110d, a first side face 130d, a second side face 150d, and a top face 140. The first side face 130d upwardly extends from a first edge of the bottom face 110d. The second side face 150d vertically extends from a second edge of the bottom face 110d. Thus, the second side face 150d is opposite to the first side face 130d. The top face 140 horizontally extends from an upper end of the first side face 130d and from an upper end of the second side face 150d. The first side face 130d has openings 135 through which lamps 50 are moved such as during assembly or lamp replacement. Also, a cut space similar to cut space 113 of the prior embodiments is formed from the first edge of the bottom face 110d.

The reflection sheet 300e is positioned on the receiving member 400 and adjacent the first edge of the bottom face 110d. That is, the reflection sheet 300e is not interposed between the bottom face 110d and the receiving member 400. During assembly, the lamp-fixing member 200 would be secured to the mod frame 100d prior to placement of the reflection sheet 300e upon the receiving member 400.

Figure 14:
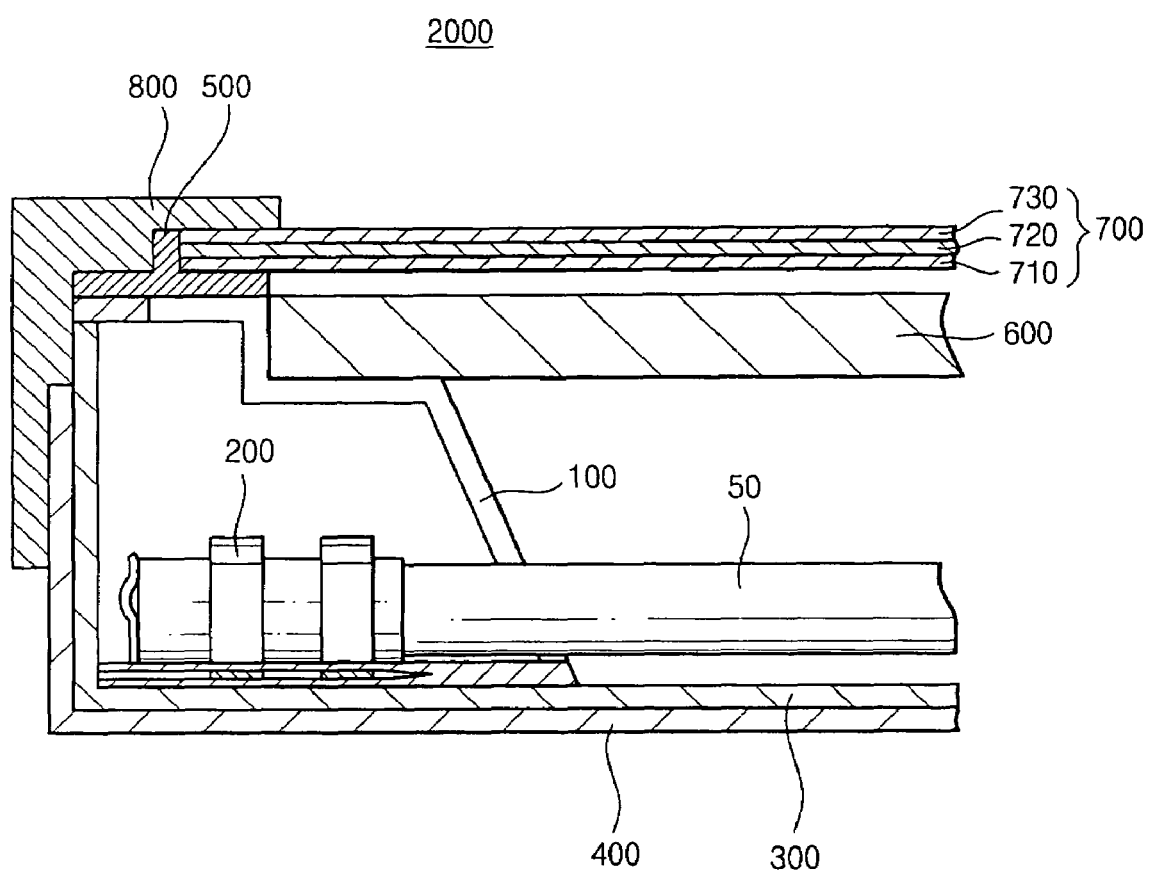
FIG. 14 is a cross sectional view illustrating an exemplary embodiment of an LCD apparatus in accordance with the present invention.

FIG. 14 is a cross sectional view illustrating an exemplary embodiment of an LCD apparatus in accordance with the present invention.

Referring to FIG. 14, an LCD apparatus 2000 includes a backlight assembly 1000, an LCD panel 700, a top chassis 800, and a supporting member 500.

The backlight assembly 1000 includes a mold frame 100, a lamp-fixing member 200, a reflection sheet 300, a receiving member 400, an optical member 600, and lamps 50.

The mold frame 100 includes a bottom face 110, a side face 130, and a top face 140. The side face 130 upwardly extends from a first edge of the bottom face 110. Thus, the mold frame 100 has three opened side faces 120 including a first opened side face 121, and second and third opened side faces 122, 123 oppositely facing each other. The top face 140 horizontally extends from an upper end of the side face 130 to an upper end of first opened side face 121.

The side face 130 has openings 135 through which lamps 50 are moved, such as during assembly or lamp replacement. The number of openings 135 may be equal to a number of lamps 50 supported within the lamp-supporting unit. The openings 135 are sized for receiving a lamp 50 there through, and therefore have a width at least slightly greater than a diameter of a lamp 50. The top face 140 includes a first horizontal portion 142 horizontally extending from the upper end of the side face 130, a stepped portion 146 vertically extending from the first horizontal portion 142, and a second horizontal portion 144 horizontally extending from the stepped portion 146. Thus, the first horizontal portion 142 has a height lower than that of the second horizontal portion 144, with respect to the bottom face 110. That is, a distance between the bottom face 110 and the first horizontal portion 142 is less than a distance between the bottom face 110 and the second horizontal portion 144.

For allowing ends of the lamps 50 to be vertically moved through the openings 135, the openings 135 are also formed through the first and second horizontal portions 142 and 144 and the stepped portion 146. Thus, such as during assembly or lamp replacement, the lamps 50 are downwardly moved through the openings 135 in a vertical direction and are then secured to the lamp-fixing member 200. The lamps 50 may correspond to an external lamp or an internal lamp.

The bottom face 110 includes an elastic material. The bottom face 110 is cut in the horizontal direction from a second edge of the bottom face 110, from where the first opened side face 121 extends, opposite to the first edge, from where the side face 130 extends, to form a cut space 113. Thus, the cut space 113 divides the bottom face 110 into an upper first bottom portion 110a and a lower second bottom portion 110b positioned under the first bottom portion 110a. Also, a groove 116 is formed at a second edge portion of the first bottom portion 110a, but not through the second bottom portion 110b. There may be as many or more grooves 116 as there are lamps 50 to be supported by the lamp-fixing member 200. The lamp-fixing member 200 is received in the groove 116. Since the bottom face 110 includes the elastic material, the cut space 113 is broadened when two forces are upwardly and downwardly applied to the first and second bottom portions 110a and 110b, respectively. Thus, after portions of the lamp-fixing member 200 are slidably inserted into the broadened cut space 113, the forces applied to the first and second bottom portions 110a and 110b are released. The first and second bottom portions 110a and 110b having elasticity are then returned to original positions to firmly secure the portions of the lamp-fixing member 200 there between, with other portions of the lamp fixing member 200 extending outwardly from the groove 116.

The lamp-fixing member 200 includes a base 210, at least one supporting plate 220 that is formed on the base 210 and supports the end of the lamp, and clips 230 that are formed on the base 210 and elastically hold the lamp. To vertically insert the lamp into the clips 230, the clips 230 have opened upper portions. The lamp-fixing member 200 may include a conductive material. The base 210 of the lamp-fixing member 200 is slidably inserted into the cut space 113 as the clips 230 are received in the grooves 116. Here, the numbers of the supporting plate 220 and the clips 230 correspond to numbers of the lamps. Alternatively, the light-fixing member 200 may include at least three clip pairs 230 per supporting plate 220.

The reflection sheet 300 includes a bottom sheet positioned under the bottom face 110 of the mold frame 100, and three side sheets upwardly extending from edges of the bottom sheet. The three side sheets of the reflection sheet 300 enclose the opened side faces 121, 122, 123 of the mold frame 100. To electrically isolate the lamp-fixing member 200, the side sheets of the reflection sheet 300 may include an insulation material.

The receiving member 400 is arrayed under the reflection sheet 300. The mold frame 100 having the lamp-fixing member 200 and the reflection sheet 300 are received in the receiving member 400. The receiving member 400 may also include side surfaces extending upwardly from edges of a bottom portion of the receiving member 400, thus defining a receiving space therein.

After the lamps 50 are inserted through the mold frame 100 and fixed by the lamp fixing member 200, the optical member 600 is placed on the first horizontal portion 142 of the top face 140. A side face of the optical member 600 closely makes contact with the stepped portion 146 of the top face 140. A top surface of the optical member 600 may be flushly aligned with the second horizontal portion 144. The optical member 600 improves characteristics of light rays emitted from the lamps 50. The optical member 600 may include a diffusion plate (not shown), a prism sheet (not shown), etc. Alternatively, the optical member 600 may be placed on an uneven structure that is formed on the top face 140 of the mold frame 110.

The LCD panel 700 includes a lower substrate 710, an upper substrate 730 arrayed over the lower substrate 710, and an LC layer 720 interposed between the upper and lower substrates 730 and 710.

The lower substrate 710 corresponds to a transparent glass substrate on which thin film transistors ("TFTs") (not shown) serving as a switch are arrayed in a matrix form. Data lines and gate lines are electrically connected to source terminals and gate terminals of the TFTs, respectively. Pixel electrodes including indium tin oxide ("ITO") are formed on drain terminals. The upper substrate 730 corresponds to a color filter substrate on which color filters including red, green, and blue pixels are formed. A common electrode including ITO is formed on the upper substrate 730.

The supporting member 500 is disposed between the top chassis 800 and the mold frame 100. The supporting member 500 is coupled to the top chassis to support the LCD panel 700. The optical member 600 is spaced apart from the LCD panel 700 through the supporting member 500.

The data lines are electrically connected to a data printed circuit board ("PCB") through first tape carrier packages ("TCPs"). The gate lines are electrically connected to a gate PCB through second TCPs. The data and gate PCBs transmit a driving signal and a timing signal to the gate lines and the data lines, respectively, via the first and second TCPs.

Here, the LCD apparatus of the present embodiment may include the backlight assemblies 1100 and 1200 in place of the backlight assembly 1000. Also, any of the above described mold frames and lamp-fixing members may also be employed within the LCD apparatus.

According to the present invention, the lamp-supporting unit includes one body type mold frame so that the lamp-supporting unit may be assembled by a simple process, thereby reducing a cost for manufacturing the lamp-supporting unit. That is, the mold frame includes a one-piece unit, such as, but not limited to, an integrally molded solitary unit, thus eliminating the need for two separate sub-frames.

Also, since the lamp-fixing member is slidably combined with the mold frame, the lamp-fixing member may be readily detached from the mold frame.

Further, the lamps may be inserted into the clips of the lamp-fixing member in the vertical direction so that the lamps may be firmly secured.

Having described the exemplary embodiments of the present invention and its advantages, it is noted that various changes, substitutions and alterations can be made herein without departing from the spirit and scope of the invention as defined by appended claims.

What is claimed is:

1. A lamp-supporting unit comprising:
    a mold frame comprising a bottom face, a side face upwardly extending from an edge of the bottom face, and a top face horizontally extending from an upper end of the side face, the side face having an opening through which a lamp is moved,
    the top face of the mold frame comprising:
        a first horizontal portion horizontally extending from the upper end of the side face of the mold frame, and
        a second horizontal portion being substantially in parallel with the first horizontal portion, the second horizontal portion disposed non-coplanar with the first horizontal portion and adjacent to the first horizontal portion in a longitudinal direction of the lamp; and
    a lamp-fixing member separable from the mold frame and combined with the mold frame;
    wherein the mold frame is positioned at each of ends of the lamp, and the end of the lamp is coupled to the lamp fixing member of the mold frame.

2. The lamp-supporting unit of claim 1, further comprising a reflection sheet reflecting a light emitted from the lamp, wherein the reflection sheet comprises a bottom sheet positioned under the bottom faces of the mold frames.

3. The lamp-supporting unit of claim 2, further comprising side sheets of the reflection sheet extending from edges of the bottom sheet, wherein one of the side sheets opposite the side face of the mold frame comprises an insulation material.

4. The lamp-supporting unit of claim 2, further comprising a receiving member positioned under the bottom sheet of the reflection sheet, the receiving member receiving the reflection sheet therein.

5. The lamp-supporting unit of claim 1, wherein the opening extends to the top face of the mold frame.

6. The lamp-supporting unit of claim 5, wherein the top face of the mold frame further comprises:
    a stepped portion vertically extending from the first horizontal portion; and
    the second horizontal portion horizontally extending from an upper end of the stepped portion.

7. The lamp-supporting unit of claim 6, further comprising an optical member placed on the first horizontal portions of the top faces.

8. The lamp-supporting unit of claim 6, wherein the opening extends through the first horizontal portion, the stepped portion, and the second horizontal portion.

9. The lamp-supporting unit of claim 1, wherein the opening has a square shape.

10. The lamp-supporting unit of claim 1, wherein the opening has a circular shape.

11. The lamp-supporting unit of claim 1, wherein the bottom face of the mold frame comprises:
    a first bottom portion;
    a second bottom portion positioned under the first bottom portion; and
    a cut space formed between the first and second bottom portions, a base portion of the lamp-fixing member being slidably inserted into the cut space.

12. The lamp-supporting unit of claim 11, wherein the first bottom portion has a groove in which the lamp-fixing member is received and from which a clip portion of the lamp-fixing member extends.

13. The lamp-supporting unit of claim 11, wherein the cut space extends only partially through the bottom face.

14. The lamp-supporting unit of claim 11, comprising an elastic material forming the bottom face, the elastic material conforming around the base portion of the lamp-fixing member after the base portion is inserted into the cut space.

15. The lamp-supporting unit of claim 1, wherein the lamp-fixing member comprises a base and a clip formed on the base, the lamp being fixed to the clip.

16. The lamp-supporting unit of claim 15, wherein the lamp-fixing member further comprises a supporting plate supporting the end of the lamp.

17. The lamp-supporting unit of claim 15, wherein the clip comprises a pair of at least two clipping members opposite to each other.

18. The lamp-supporting unit of claim 15, wherein the clip comprises only one pair of clipping members opposite to each other.

19. The lamp-supporting unit of claim 15, wherein the clip has an opened end through which the end of the lamp is inserted, and a closed end supporting the end of the lamp.

20. The lamp-supporting unit of claim 19, wherein the clip has a rectangular parallelepiped shape.

21. The lamp-supporting unit of claim 19, wherein the clip has a cylindrical shape.

22. The lamp-supporting unit of claim 1, wherein the lamp-fixing member comprises a conductive material.

23. The lamp-supporting unit of claim 1, wherein the lamp-fixing member holds the end of the lamp and applies an external power to the lamp.

24. The lamp-supporting unit of claim 1, wherein the end of the lamp corresponds to an external electrode of the lamp.

25. The lamp-supporting unit of claim 1, wherein the side face is slanted toward the lamp with respect to a vertical face of the bottom face.

26. The lamp-supporting unit of claim 1, further comprising a plurality of openings in the side face of the mold frame and a plurality of clip members on the lamp-fixing member corresponding to a number of lamps to be supported by the lamp-supporting unit.

27. The lamp-supporting unit of claim 1, wherein the mold frame is a one-piece unit.

28. A backlight assembly comprising:
    a mold frame comprising:
        a bottom face,
        a side face upwardly extending from an edge of the bottom face and having an opening, and
        a top face horizontally extending from an upper end of the side face, the top face including:
            a first horizontal portion horizontally extending from the upper end of the side face of the mold frame; and
            a second horizontal portion disposed substantially parallel with the first horizontal portion, the second horizontal portion disposed non-coplanar with the first horizontal portion and adjacent to the first horizontal portion in a longitudinal direction of the lamp;
    a lamp-fixing member separable from the mold frame and combined with a mold frame;
    a reflection sheet reflecting a light, the reflection sheet including a bottom sheet positioned under the bottom face of the mold frame, and side sheets extending from edges of the bottom sheet;
    a receiving member placed under the reflection sheet, the reflection sheet being received in the receiving member; and
    a lamp fixed to the lamp fixing member and movable through the opening of the side face, the lamp emitting the light;

wherein the mold frame is positioned at each of ends of the lamp, the end of the lamp is coupled to the lamp fixing member of the mold frame.

29. The backlight assembly of claim 28, further comprising an optical member positioned on the top faces of the mold frames and improving light characteristics of the light.

30. The backlight assembly of claim 29, wherein the optical member comprises a single diffusion plate.

31. The backlight assembly of claim 29, wherein the optical member comprises a plurality of diffusion plates.

32. The backlight assembly of claim 29, wherein the top face of the mold frame further comprises:
the optical member placed on the first horizontal portion;
a stepped portion vertically extending from the first horizontal portion; and
the second horizontal portion horizontally extending from an upper end of the stepped portion.

33. The backlight assembly of claim 29, wherein the top face of the mold frame has an uneven structure on which the optical member is placed.

34. The backlight assembly of claim 28, wherein the lamp corresponds to an external electrode lamp.

35. The backlight assembly of claim 28, wherein the lamp corresponds to an internal electrode lamp.

36. The backlight assembly of claim 28, wherein the lamp-fixing member is elastically held within the mold frame by the bottom face of the mold frame.

37. A backlight assembly comprising:
a mold frame comprising a mold frame including a bottom face, a first side face upwardly extending from a first edge of the bottom face and having an opening, a second side face upwardly extending from a second edge of the bottom face that is opposite to the first edge, and a top face horizontally extending from an upper end of the first side face, the opening extending from a lower end of the first side face;
the top face including:
a first horizontal portion horizontally extending from the upper end of the side face of the mold frame; and
a second horizontal portion disposed substantially parallel with the first horizontal portion, the second horizontal portion disposed non-coplanar with the first horizontal portion;
a lamp-fixing member separable from the mold frame and combined with a mold frame;
a reflection sheet positioned under the bottom face of the mold frame, the reflection sheet reflecting a light;
a receiving member placed under the reflection sheet, the reflection sheet received in the receiving member;
an optical member positioned contacting the top face of the mold frame; and
a lamp fixed to the lamp fixing member and movable through the opening of the side face, the lamp emitting the light toward the optical member;
wherein the mold frame is positioned at each of ends of the lamp, and the end of the lamp is coupled to the lamp fixing member of the mold frame, and both the first horizontal portion and the second horizontal portion overlap the lamp.

38. A backlight assembly comprising:
a mold frame comprising a bottom face, a first side face upwardly extending from a first edge of the bottom face and having an opening, a second side face upwardly extending from a second edge of the bottom face that is opposite to the first edge, and a top face horizontally extending from an upper end of the first side face, the opening extending from a lower end of the first side face,
the top face including:
a first horizontal portion horizontally extending from the upper end of the side face of the mold frame; and
a second horizontal portion disposed substantially parallel with the first horizontal portion, the second horizontal portion disposed non-coplanar with the first horizontal portion;
a lamp-fixing member separable from the mold frame and combined with the mold frame;
a reflection sheet positioned on a plane that is substantially identical to a plane on which the bottom face of the mold frame are placed, and making contact with the bottom face of the mold frame;
a receiving member placed under the reflection sheet, the reflection sheet received in the receiving member;
an optical member positioned on the top face of the mold frame; and
a lamp fixed to the lamp-fixing member, the lamp movable through the opening of the side face, the lamp emitting a light toward the optical member;
wherein the mold frame is positioned at each of ends of the lamp, and the end of the lamp is coupled to the lamp fixing member of the mold frame, and both the first horizontal portion and the second horizontal portion overlap the lamp.

39. A liquid crystal display apparatus comprising:
a liquid crystal display panel including a lower substrate, an upper substrate, and a liquid crystal layer interposed between the lower and upper substrates, the liquid crystal display panel displaying an image using a light; and
a backlight assembly providing the light to the liquid crystal display panel, the backlight assembly including:
a mold frame comprising a bottom face, a side face upwardly extending from an edge of the bottom face and having an opening, and a top face horizontally extending from an upper end of the side face,
the top face of the mold frame including:
a first horizontal portion horizontally extending from the upper end of the side face of the mold frame; and
a second horizontal portion disposed substantially parallel with the first horizontal portion;
a lamp-fixing member separable from the mold frames and combined with a mold frame;
a reflection sheet reflecting the light, the reflection sheet including a bottom sheet positioned under the bottom face of the mold frame, and side sheets extending from edges of the bottom sheet;
a receiving member placed under the bottom sheet of the reflection sheet, the reflection sheet received in the receiving member and disposed on a bottom face of the receiving member, the bottom face of the receiving member disposed closer to the first horizontal portion of the mold frame than the second horizontal portion;
an optical member positioned on the top face of the mold frame; and
a lamp fixed to the lamp-fixing member, the lamp movable through the opening of the side face, the lamp emitting the light toward the optical member;
wherein the mold frame is positioned at each of ends of the lamp, and the end of the lamp is coupled to the lamp fixing member of the mold frame, and both the first horizontal portion and the second horizontal portion overlap the lamp.

40. A lamp-supporting unit comprising:
a mold frame having a one-piece structure and including:
- a bottom face, the bottom face formed of an elastic material;
- a side face extending from the bottom face; and
- a top face extending from an upper end of the side face, the side face having an opening for moving a lamp there through, the top face of the mold frame comprising:
- a first horizontal portion horizontally extending from the upper end of the side face of the mold frame, and
- a second horizontal portion disposed substantially parallel with the first horizontal portion, the second horizontal portion disposed non-coplanar with the first horizontal portion; and, a lamp-fixing member separable from the mold frame and elastically held to the mold frame by the bottom face.

41. The lamp-supporting unit of claim 40, further comprising a cut space formed between a first bottom portion and a second bottom portion of the bottom face, a base portion of the lamp-fixing member elastically held between the first bottom portion and the second bottom portion.

42. The lamp-supporting unit of claim 41, further comprising a groove in the first bottom portion, a clip portion of the lamp-fixing member protruding from the groove.

43. A lamp-supporting unit comprising:
- a mold frame comprising a bottom portion and a side portion upwardly extending from the bottom face, the side face having an opening through which a lamp is moved; and
- a lamp-fixing member slidably combined with the mold frame.

44. The lamp-supporting unit of claim 43, wherein the bottom portion has a groove, through which the lamp-fixing member is slidably inserted to be combined with the mold frame.

45. The lamp-supporting unit of claim 43, wherein the bottom portion includes a first plate, a second plate and a cut space formed between the first and second plates, and the lamp-fixing member is slidably inserted into the cut space to be combined with the mold frame.

* * * * *